US007393799B2

(12) United States Patent
Porter

(10) Patent No.: US 7,393,799 B2
(45) Date of Patent: *Jul. 1, 2008

(54) BREATHABLE, WATERPROOFING, TEAR-RESISTANT FABRIC

(75) Inventor: John Frederick Porter, Ontario (CA)

(73) Assignee: Saint-Gobain Technical Fabrics Canada, Ltd, Northborough, MA (US)

( * ) Notice: Subject to any disclaimer, the term of this patent is extended or adjusted under 35 U.S.C. 154(b) by 68 days.

This patent is subject to a terminal disclaimer.

(21) Appl. No.: 10/731,767

(22) Filed: Dec. 9, 2003

(65) Prior Publication Data

US 2005/0124240 A1 Jun. 9, 2005

(51) Int. Cl.
B32B 5/26 (2006.01)
B32B 27/12 (2006.01)

(52) U.S. Cl. .............. 442/35; 442/36; 442/38; 442/43; 442/45; 442/46; 442/49; 442/76; 442/136; 442/381; 442/394; 428/920; 428/921

(58) Field of Classification Search .............. 42/35, 42/36, 38, 43, 45, 46, 49, 76, 136, 381, 394; 428/920, 921

See application file for complete search history.

(56) References Cited

U.S. PATENT DOCUMENTS

| 3,338,992 | A | 8/1967 | Kinney |
| 3,341,394 | A | 9/1967 | Kinney |
| 3,502,763 | A | 3/1970 | Hartman |
| 3,542,615 | A | 11/1970 | Dobo et al. |
| 3,692,618 | A | 9/1972 | Dorschner et al. |
| 3,802,817 | A | 4/1974 | Matsuki et al. |
| 3,832,214 | A | 8/1974 | Wang |
| 3,855,046 | A | 12/1974 | Hansen et al. |
| 4,041,203 | A | 8/1977 | Brock et al. |
| 4,194,041 | A | 3/1980 | Gore et al. |
| 4,340,563 | A | 7/1982 | Appel et al. |
| 4,725,481 | A | 2/1988 | Ostapchenko |
| 4,808,675 | A | 2/1989 | Twilley et al. |
| 5,145,727 | A | 9/1992 | Potts et al. |
| 5,169,706 | A | 12/1992 | Collier et al. |
| 5,169,712 | A | 12/1992 | Tapp |
| 5,178,931 | A | 1/1993 | Perkins et al. |
| 5,188,885 | A | 2/1993 | Timmons et al. |
| 5,208,098 | A | 5/1993 | Stover |
| 5,208,313 | A | 5/1993 | Krishnan |
| 5,283,112 | A | 2/1994 | Krishnan |
| 5,491,017 | A | 2/1996 | Todt |
| 5,733,824 | A * | 3/1998 | Brunka et al. ............... 442/153 |
| 5,869,408 | A | 2/1999 | Porter et al. |
| 5,881,521 | A | 3/1999 | Porter et al. |
| 5,895,301 | A | 4/1999 | Porter et al. |
| 6,046,118 | A | 4/2000 | Jones et al. |
| 6,071,834 | A | 6/2000 | Martz |
| 6,100,208 | A | 8/2000 | Brown et al. |
| 6,171,689 | B1 | 1/2001 | Kaytor et al. |
| 6,187,696 | B1 | 2/2001 | Lim et al. |
| 6,238,767 | B1 | 5/2001 | McCormack et al. |
| 6,274,520 | B1 * | 8/2001 | Cordell ...................... 442/381 |
| 6,286,145 | B1 | 9/2001 | Welchel et al. |
| 6,352,948 | B1 | 3/2002 | Pike et al. |
| 6,355,333 | B1 | 3/2002 | Waggoner et al. |
| 6,410,465 | B1 | 6/2002 | Lim et al. |
| 6,649,548 | B1 | 11/2003 | Shawver et al. |
| 6,696,120 | B1 * | 2/2004 | Todt .......................... 428/34.9 |
| 7,148,160 | B2 | 12/2006 | Porter |
| 2005/0106965 | A1 * | 5/2005 | Wevers et al. ............... 442/85 |
| 2005/0214501 | A1 * | 9/2005 | Baychar ..................... 428/90 |

FOREIGN PATENT DOCUMENTS

JP 2002172739 A 6/2002

OTHER PUBLICATIONS

Obermeyer, trade literature, Feb. 10, 2004, pp. 1-2.
The North Face Footwear, trade literature, Feb. 10, 2004, pp. 1-5.
Tyvek, trade literature, Feb. 10, 2004, pp. 1-3.
News from Orvis, trade literature, Feb. 10, 2004, pp. 1-8.
International Search Report dated May 17, 2004.
Xavan BF, "Moisture Control Air Tight Sheet" translation of Japanese presentation, 2004, pp. 1-13.

* cited by examiner

Primary Examiner—Ula C Ruddock
(74) Attorney, Agent, or Firm—Duane Morris LLP

(57) ABSTRACT

The present invention relates to a composite sheet material that is moisture vapor permeable and substantially liquid impermeable, the composite sheet material including as layers a lightweight, non-wet laid polyester nonwoven, a polyurethane breathable film, a polymer-coated, high tenacity polyester mesh, and a lightweight, non-wet laid, polyester nonwoven material. The material is also abrasion, tear, mildew and fire resistant.

16 Claims, No Drawings

BREATHABLE, WATERPROOFING, TEAR-RESISTANT FABRIC

FIELD OF THE INVENTION

The present invention relates to a moisture vapor permeable, substantially liquid impermeable, composite sheet material.

BACKGROUND OF THE INVENTION

Lamination is carried out in a post film formation step. In order for lamination to be feasible, the moisture vapor permeable film must have enough structure, tensile strength and tear strength such that the film can be formed, wound onto a roll, and later unwound and handled during the lamination process. The lamination can involve one or more methods; thermal lamination (melting an existing component), adhesive lamination (adding a liquid component just prior to laminating), ultrasonic lamination (a vibration process which softens or melts components, similar to thermal lamination), etc. It is extremely difficult to handle moisture vapor permeable films less than 20 microns (0.8 mil) in thickness during the adhesive lamination process without introducing holes into the film. Thus, when adhesive lamination has been used to attempt to make composite sheets with thinner films, the composite sheets have not exhibited the fluid barrier properties (e.g., hydrostatic head, dynamic fluid transmission) desirable for a composite sheet designed for use in absorbent articles or medical apparel.

Thermal lamination of moisture vapor permeable films less than 20 microns thick has similarly resulted in composite sheet materials with inadequate barrier properties. When composite sheets are made by thermally laminating a thin film to a fibrous substrate, the thin film handling problems associated with adhesive lamination as described above are encountered. In addition, in order to carry out a thermal lamination, the film must be subjected to elevated temperatures and pressures so as to soften the film and force it into mechanical engagement with the fibrous substrate. Generally, the peel strength between the film and the fibrous substrate increases with increasing extrusion melt temperatures and increasing nip pressures. Unfortunately, when moisture vapor permeable films with a thickness of less than about 20 microns are subjected to the elevated temperatures and pressures needed to obtain adequate peel strength in the composite sheet, small holes develop in the film such that the composite sheet does not exhibit the fluid barrier properties desired in a composite sheet for use in absorbent articles or medical apparel. These small holes can result from the non-uniform temperature throughout the web during bonding and from high bonding pressures used in the prior art.

Extrusion coating processes disclosed in the prior art are similarly unable to generate a composite sheet with a thin moisture vapor permeable film of less than about 20 microns (0.8 mil) that also has the barrier properties and moisture vapor transmission properties desirable for use in medical apparel and absorbent article applications. In an extrusion coating process, the polymer that forms the film is melted at an elevated temperature to reduce its viscosity such that when the polymer melt is coated onto the fibrous substrate and passed through a nip, the melt is pressed into engagement with the fibrous network of the substrate. Unfortunately, the low viscosity of the melted polymer, the pressure of the nip, and the thinness of the film each contribute to the generation of small holes in the film. In addition, thinner films are more susceptible to fiber protrusion through the film, which also contributes to small holes.

Accordingly, there is a need for a composite sheet material that acts as a barrier to fluids, yet is also highly permeable to moisture vapor, with improved mechanical properties, such as enhanced tensile strength, tear resistance and puncture resistance.

Existing membranes, for example, those designed to be located on roofs under terra-cotta tiles, have certain limitations. For example, some are heavier than about 170 grams/square meter, but have good tear resistance. The materials of the present invention may have weights as low as about 100 grams/square meter, while maintaining good tear resistance, or at about 200 grams/square meter, having very high tear resistances. Typically these membranes use laminates containing microporous polyolefin films. These films have intrinsic breathability variability due to the mechanical nature of the porosity (microscopic tears or holes that can fail to form in the extrusion process, or may "heal" in the lamination process).

SUMMARY OF THE INVENTION

The present invention relates to a moisture vapor permeable, substantially liquid impermeable composite sheet or multilayer laminate comprising, as layers: a first lightweight, non-wet laid (i.e., not wet laid), polyester nonwoven material; a polyurethane breathable film; a polymer-coated polyester mesh; and a second lightweight, non-wet laid, polyester nonwoven material.

DETAILED DESCRIPTION OF THE INVENTION

The present invention relates generally to a moisture vapor permeable, substantially liquid impermeable composite sheet material. The composite sheet material of the present invention is preferably a lightweight, open spunbond with high air permeability, and an open mesh reinforcement. Therefore, there is a significant area of the breathable film that remains open to the atmosphere for moisture vapor breathing, yet tear strength is maximized. Furthermore, a degree of flame retardancy is given by the coating on the mesh. The coating may be, e.g., a polyvinyl chloride (PVC) polymer or copolymer, a polyurethane polymer or copolymer, an acrylic polymer or copolymer, a styrene-acrylic acid copolymer, a vinylidene chloride copolymer, or blends thereof. A polyvinyl chloride polymer or copolymer coating is preferred. Alternatively, the polyester mesh could be replaced with e.g., nylon or natural fiber meshes. The coatings should exhibit adhesion to the film and nonwoven layers, in order to minimize chances for delamination. In addition, the polymer coating helps to reduce the water wicking (and possible subsequent delamination) that could occur if the multifilament yarn edge was exposed to moisture. This can happen at cut edges and at holes—such as where nails or staples are used to hold the laminate onto the substrate.

As used herein, the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "spunbond" fibers refers to small diameter fibers which are formed by extruding molten thermoplastic material as filaments from a plurality of fine, usually circular capillaries of a spinneret with the diameter of the extruded filaments then being rapidly reduced as, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

As used herein, the term "multilayer laminate" means a laminate wherein some of the layers are spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate in a manner described below. Such fabrics usually have a basis weight of from about 0.1 to 12 osy (3.4 to 400 gsm), or more particularly from about 0.75 to about 3 osy. Multilayer laminates may also have various numbers of meltblown layers or multiple spunbond layers in many different configurations and may include other materials like films (F) or coform materials, e.g. SMMS, SM, SFS, etc.

As used herein, the term "thermal point bonding" involves passing a fabric or web of fibers to be bonded between a heated calendar roll and an anvil roll. The calendar roll is usually, though not always, patterned in some way so that the entire fabric is not bonded across its entire surface, and the anvil roll is usually flat. As a result, various patterns for calendar rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric laminate web. As is well known in the art, the spot bonding holds the laminate layers together as; well as imparts integrity to each individual layer by bonding filaments and/or fibers within each layer.

As used herein, the term "ultrasonic bonding" means a process performed, for example, by passing the fabric between a sonic horn and anvil roll as illustrated in U.S. Pat. No. 4,374,888 to Bornslaeger.

As used herein, the term "nonwoven" material means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As a reference, the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

Generally, to qualify as being "breathable" for the present invention, the resultant laminate should have a water vapor transmission rate (WVTR) of at least about 250 $g/m^2/24$ hours as may be measured by a test method as described below. Furthermore, the films may be apertured. In forming the films, the films may be coextruded to increase bonding and alleviate die lip build-up. Processes for forming composite materials are well-known. Details related to such manufacture are found in e.g., U.S. Pat. No. 6,238,767, herein incorporated by reference.

Because the components of the present invention are predominantly polyester or polyester-containing materials, the flame retardancy may be increased with a polyester-active flame retardant. This is especially true if the PVC binder on the scrim is replaced with a polyester type binder.

The first and second lightweight, non-wet laid, polyester nonwoven materials may, in addition to polyester, further comprise polyolefins, rayon and polyamides. The materials may be spunbond, thermal point-bonded or ultrasonically-bonded (for nonwovens); chemically-bonded (for polyester nonwoven webs); or hydraulically-entangled (for polyester webs). In a preferred embodiment of the present invention, the composite sheet has a weight greater than about 100 grams/square meter, with a weight from about 100-200 grams/square meter particularly preferred. In a further preferred embodiment of the present invention, the non-wet laid, polyester nonwoven materials comprise polyethylene terephthalate.

Note that the lamination that takes place among and between layers leads to a dermal bond, thus further strengthening the waterproofing effects. Although a particularly preferred use for the present invention is as a membrane under terra cotta or slate tile roofing membranes, other end uses are also possible, e.g., as housewrap (wind barrier for building walls under siding, etc.), insulation facing, or alternatively, the material may be cut and sewn to make protective clothing.

Note also that most breathable webs are created by either coating a nonwoven or laminating a film to one or more nonwovens. The film approach may involve a film that is either microporous (containing millions of holes of diameter less than about 1 micron in diameter), or heterogeneous (with regions of hydrophobic polymer and regions of hydrophilic polymer within the same film). In contrast, the present invention combines two nonwoven webs in order to protect the sensitive film from abrasion, as well as a strong mesh. The mesh contributes to tensile, tear and puncture resistance, while keeping portions of the film free to breathe.

The product configuration of the present invention can achieve very high strength to weight ratios and very exhibit high strengths without a significant compromise in permeability. In addition, note that the prior art includes polypropylene (PP) laminates such as PPnonwoven/PPmicroporous film/PPnonwoven. These structures are intrinsically sensitive to variation in water vapor permeability or laminate strength. For example, if excessive heat is used, the microporosity can be reduced by thermal flow closing or shrinking the holes. Conversely, if insufficient heat is used, then delamination can occur. The use of contiguous but heterogeneous polyurethane films reduces the temperature sensitivity. In order to use this film more components should be used which are more heat resistant than PP, namely polyester.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A moisture vapor permeable, substantially liquid impermeable composite for roofing, housewrap or protective clothing comprising:
    a mesh reinforcement providing tear resistance;
    a composite sheet comprising, a liquid impermeable film comprising polyurethane substantially impermeable to liquid water, and at least one lightweight outer layer of fibers bonded to said liquid impermeable film, said lightweight outer layer protecting said liquid impermeable film from abrasion;
    said mesh reinforcement and said impermeable film and said lightweight outer layer being bonded together to form said composite; and
        each of said mesh reinforcement and said liquid impermeable film and said lightweight outer layer being substantially moisture vapor permeable while being bonded together, such that said composite is substantially moisture vapor permeable throughout, and wherein said lightweight outer layer comprises, a nonwoven layer.

2. The composite as recited in claim 1, wherein the composite has a weight of about 100-200 grams/square meter.

3. The composite as recited in claim 1, wherein said mesh reinforcement comprises, a polyester resin.

4. The composite as recited in claim 1, wherein said lightweight outer layer comprises a first nonwoven layer of fibers, and further comprising, a second lightweight nonwoven layer of fibers, said mesh reinforcement and said impermeable film being between and bonded to said first and said second nonwoven layers of fibers.

5. The composite as recited in claim 1, having an ASTM D3833 water vapor transmission rate of greater than 250 g/m$^2$/day.

6. The composite as recited in claim 1, wherein the composite has an areal weight of less than about 200 grams/square meter.

7. The composite as recited in claim 6, wherein said lightweight outer layer comprises a first nonwoven layer of polyester fibers, polyolefin fibers, rayon fibers, polyamide fibers or polyethylene terethphalate fibers, and further comprising, a second lightweight nonwoven layer of polyester fibers, polyolefin fibers, rayon fibers, polyamide fibers or polyethylene terethphalate fibers, said mesh reinforcement and said impermeable film being between and bonded to said first nonwoven layer and said second nonwoven layer.

8. The composite as recited in claim 1, wherein the lightweight outer layer is spunbond, thermal point-bonded, hydraulically entangled, ultrasonically bonded, chemically bonded, or a combination thereof.

9. The composite as recited in claim 1, wherein the mesh reinforcement contains a polymer coating.

10. The composite as recited in claim 9, further comprising: a polymer-active flame retardant in said coating.

11. The composite as recited in claim 1, wherein the composite has an areal weight less than about 200 grams/square meter.

12. The composite as recited in claim 1, wherein said mesh reinforcement is coated with a polymer selected from the group comprising: a polyvinyl chloride polymer or copolymer, a polyurethane polymer or copolymer, an acrylic polymer or copolymer, a styrene-acrylic acid copolymer, a vinylidene chloride copolymer, and blends thereof.

13. The composite as recited in claim 1, further comprising: a coating on the mesh reinforcement reducing both water wicking of the mesh reinforcement and unraveling at a cut edge of the mesh reinforcement.

14. The composite as recited in claim 13, further comprising: a polymer-active flame retardant in said coating.

15. A moisture vapor permeable, substantially liquid impermeable composite for roofing, housewrap or protective clothing comprising:
    a mesh reinforcement providing tear resistance;
    a composite sheet comprising, a liquid impermeable film comprising polyurethane substantially impermeable to liquid water, and at least one lightweight outer layer of fibers bonded to said liquid impermeable film, said outer layer protecting said liquid impermeable film from abrasion;
    said mesh reinforcement and said impermeable film and said outer layer being bonded together to form said composite; and
    each of said mesh reinforcement and said liquid impermeable film and said outer layer being substantially moisture vapor permeable while being bonded together, such that said composite is substantially moisture vapor permeable throughout, and
    wherein said outer layer comprises, an outer layer of non-wet laid fibers.

16. A moisture vapor permeable, substantially liquid impermeable composite for roofing, housewrap or protective clothing comprising:

a mesh reinforcement providing tear resistance;

a composite sheet comprising, a liquid impermeable film comprising polyurethane substantially impermeable to liquid water, and at least one lightweight outer layer of fibers bonded to said liquid impermeable film, said outer layer protecting said liquid impermeable film from abrasion;

said mesh reinforcement and said impermeable film and said outer layer being bonded together to form said composite;

each of said mesh reinforcement and said liquid impermeable film and said outer layer being substantially moisture vapor permeable while being bonded together, such that said composite is substantially moisture vapor permeable throughout; and another lightweight outer layer of fibers protecting said liquid impenneable film from abrasion; and said liquid impermeable film being between and bonded to said outer layers.

* * * * *